US012612044B2

(12) United States Patent (10) Patent No.: US 12,612,044 B2
Sekijima et al. (45) Date of Patent: Apr. 28, 2026

(54) DRIVING ASSISTANCE APPARATUS AND DRIVING ASSISTANCE METHOD

(71) Applicant: HONDA MOTOR CO., LTD., Tokyo (JP)

(72) Inventors: Yasuhiro Sekijima, Tokyo (JP); Ryo Tahara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 18/125,750

(22) Filed: Mar. 24, 2023

(65) Prior Publication Data

US 2023/0311891 A1 Oct. 5, 2023

(30) Foreign Application Priority Data

Mar. 31, 2022 (JP) ................................. 2022-058242

(51) Int. Cl.
*B60W 30/18* (2012.01)
*B60W 40/06* (2012.01)
*B60W 50/14* (2020.01)

(52) U.S. Cl.
CPC ...... *B60W 30/18163* (2013.01); *B60W 40/06* (2013.01); *B60W 50/14* (2013.01); *B60W 2050/146* (2013.01); *B60W 2554/80* (2020.02)

(58) Field of Classification Search
CPC ........... B60W 30/18163; B60W 40/06; B60W 50/14; B60W 2050/146; B60W 2554/80; B60W 2552/00
See application file for complete search history.

(56) References Cited

U.S. PATENT DOCUMENTS

| | | | | |
|---|---|---|---|---|
| 9,092,987 | B2 * | 7/2015 | Bone | G08G 1/167 |
| 10,013,882 | B2 * | 7/2018 | Fujii | G08G 1/167 |

(Continued)

FOREIGN PATENT DOCUMENTS

| | | |
|---|---|---|
| JP | 2004-340826 | 12/2004 |
| JP | 2020-051902 | 4/2020 |

(Continued)

OTHER PUBLICATIONS

Japanese Office Action for Japanese Patent Application No. 2022-058242 dated Jul. 29, 2025.

(Continued)

*Primary Examiner* — Lindsay M Low
*Assistant Examiner* — Brian R Kirby
(74) *Attorney, Agent, or Firm* — Amin, Turocy & Watson, LLP

(57) ABSTRACT

A driving assistance apparatus includes a position detection part, a road shape recognition part, a steering element, a driving assistance control part that controls the steering element based on the position information and the shape of the road, and an information display control part. The driving assistance control part identifies a target point where lane change needs to be completed based on the shape of the road and further determines a first point and a second point between the target point and the host vehicle. The information display control part displays information on a distance or time from a position of the host vehicle to the first point and information on a distance or time from the position of the host vehicle to the second point.

8 Claims, 7 Drawing Sheets

(56) References Cited

U.S. PATENT DOCUMENTS

| | | | | |
|---|---|---|---|---|
| 10,252,726 | B2 * | 4/2019 | Emura | B60K 35/00 |
| 12,030,511 | B2 * | 7/2024 | Nakao | B60K 35/81 |
| 12,168,437 | B2 * | 12/2024 | Yoshida | B60W 30/12 |
| 12,377,850 | B2 * | 8/2025 | Taniguchi | B60W 30/12 |
| 2009/0112462 | A1 * | 4/2009 | Lo | C01C 21/3632 |
| 2014/0067250 | A1 * | 3/2014 | Bone | G08G 1/167 |
| | | | | 701/301 |
| 2016/0231743 | A1 * | 8/2016 | Bendewald | B60K 35/22 |
| 2016/0304126 | A1 * | 10/2016 | Yamaoka | B60K 35/22 |
| 2017/0334460 | A1 * | 11/2017 | Arakawa | B60W 30/18163 |
| 2017/0341653 | A1 * | 11/2017 | Kubota | B60W 50/0097 |
| 2018/0038953 | A1 * | 2/2018 | Choi | G01S 13/931 |
| 2018/0058879 | A1 * | 3/2018 | Tayama | B60W 30/16 |
| 2018/0093676 | A1 * | 4/2018 | Emura | G08G 1/0962 |
| 2018/0099676 | A1 * | 4/2018 | Goto | G60W 30/10 |
| 2018/0141569 | A1 * | 5/2018 | Ishisaka | B60W 50/082 |
| 2018/0286242 | A1 * | 10/2018 | Talamonti | B60K 35/23 |
| 2018/0297611 | A1 * | 10/2018 | Fujisawa | G05D 1/0212 |
| 2019/0152525 | A1 * | 5/2019 | Resch | B62D 15/0255 |
| 2019/0283770 | A1 * | 9/2019 | Kubota | B62D 15/0255 |
| 2020/0103248 | A1 | 4/2020 | Ikeda et al. | |
| 2020/0172123 | A1 * | 6/2020 | Kubota | B60W 60/0053 |
| 2021/0162865 | A1 * | 6/2021 | Ogata | B60K 35/28 |
| 2022/0203834 | A1 * | 6/2022 | Nakao | B60K 35/28 |
| 2023/0099591 | A1 * | 3/2023 | Ogata | B60K 35/23 |
| | | | | 701/23 |

FOREIGN PATENT DOCUMENTS

| | | |
|---|---|---|
| JP | 2021-043084 | 3/2021 |
| JP | 2021-088222 | 6/2021 |
| JP | 2023-048898 | 4/2023 |

OTHER PUBLICATIONS

Japanese Office Action for Japanese Patent Application No. 2022-058242 mailed Oct. 28, 2025.

* cited by examiner

FIG. 2

DRIVING ASSISTANCE APPARATUS AND DRIVING ASSISTANCE METHOD

BACKGROUND OF THE INVENTION

Field of the Invention

The present invention relates to a driving assistance apparatus and a driving assistance method.

Description of Related Art

In recent years, efforts to provide access to a sustainable transportation system that considers vulnerable people among transportation participants have become active. In order to realize this, research and development for further improving the safety and convenience of traffic through research and development related to driving assistance technology is focused on.

For example, in a driving assistance system related to automatic lane change, technology of setting a final point where lane change is allowed in the system and visually displaying the distance from the current location to that point on a head-up display (HUD) has been disclosed (refer to Patent Document 1 (Japanese Unexamined Patent Application Publication No. 2021-043084), for example).

SUMMARY OF THE INVENTION

In the driving assistance technology described above, it may be possible to visually present a remaining distance or a remaining time in which an automatic lane change can be performed according to the system to a driver. However, when the lane change according to the system cannot be performed after a predetermined distance or remaining time within which automatic lane change can be performed, there is a demand for further improvement in displayed information in order to prompt appropriate action by the driver.

An object of the present invention devised in consideration of such circumstances is to provide a driving assistance apparatus capable of prompting an appropriate action by a driver when the lane change according to a system cannot be performed. By extension, an object of the present invention is to contribute to the development of sustainable transportation systems.

A driving assistance apparatus and a driving assistance method according to one aspect of the present invention employ the following configurations.

(1): The driving assistance apparatus according to the present invention includes a position detection part configured to detect position information of a host vehicle, a road shape recognition part configured to recognize a shape of a road on which the host vehicle is scheduled to travel, a steering element configured to change a traveling direction of the host vehicle, a driving assistance control part configured to control the steering element such that the host vehicle changes lanes based on the position information detected by the position detection part and the shape of the road recognized by the road shape recognition part, and an information display control part configured to visually present information to a driver driving the host vehicle, wherein the driving assistance control part identifies a target point where lane change needs to be completed based on the shape of the road recognized by the road shape recognition part and further determines a first point and a second point, the first point is a point between the target point and the host vehicle, the second point is a point between the target point and the host vehicle and is closer to the target point than the first point or is the same point as the target point, and the information display control part displays information on a distance or time from a position of the host vehicle to the first point and information on a distance or time from the position of the host vehicle to the second point.

(2): In the aspect of (1), the driving assistance control part may change lanes up to the first point and may not change lanes beyond the first point.

(3): In the aspect of (2), the driving assistance control part may recommend lane change by the driver operating the steering element up to the second point and may not recommend lane change by the driver operating the steering element beyond the second point.

(4): In the aspect of (3), the information display control part may display a display area having a predetermined size which represents information on a distance or time, and may display a first object having a size corresponding to a distance or time to the first point and a second object having a size corresponding to a distance or time to the second point in the display area.

(5): In the aspect of (4), the information display control part may continuously arrange and display the first object in a band or linear shape and the second object in a band or linear shape in a longitudinal direction.

(6): In the aspect of (5), the information display control part may change the area of the first object according to a distance or time from the host vehicle to the first point, display the second object by setting the area of the second object to a certain area in accordance with a distance or time from the first point to the second point when a distance from the target point to the host vehicle is greater than a distance from the target point to the first point, and change the area of the second object according to a distance or time from the host vehicle to the second point when the distance from the target point to the host vehicle is less than the distance from the target point to the first point.

(7): In the aspect of (6), the information display control part may set the area of the second object when multiple lane changes are required to reach the target point to be greater than the area of the second object when one lane change is required to reach the target point.

(8): The driving assistance method according to the present invention includes a position detection process of detecting position information of a host vehicle, a road shape recognition process of recognizing a shape of a road on which the host vehicle is scheduled to travel, a driving assistance control process of controlling a steering element that changes a traveling direction of the host vehicle such that the host vehicle changes lanes based on the position information detected through the position detection process and the shape of the road recognized through the road shape recognition process, and an information display control process of visually presenting information to a driver driving the host vehicle, wherein the driving assistance control process identifies a target point where lane change needs to be completed based on the shape of the road recognized through the road shape recognition process and further determines a first point and a second point, the first point is a point between the target point and the host vehicle, the second point is a point between the target point and the host vehicle and is closer to the target point than the first point or is the same point as the target point, and the information display control process displays information on a distance or time from a position of the host vehicle to the first point and information on a distance or time from the position of the host vehicle to the second point.

According to the aspects (1) to (8), it is possible to provide a driving assistance apparatus and a driving assistance method capable of prompting appropriate actions by a driver even when lane change according to a system cannot be performed.

BRIEF DESCRIPTION OF THE DRAWINGS

FIG. 2 is a diagram for describing processing when one lane change is involved in a driving assistance method according to an embodiment.

DETAILED DESCRIPTION OF THE INVENTION

Hereinafter, embodiments of a driving assistance apparatus and a driving assistance method of the present invention will be described with reference to the drawings. In the following, cases in which left-hand traffic regulations apply will be described, but when right-hand traffic regulations apply, the left and right may be reversed. Although an example in which the driving assistance apparatus and the driving assistance method of the present invention are applied to a vehicle will be described in the following embodiments, they may be applied to various moving bodies that are not limited to vehicles. Moving bodies include a wide range of structures that can be moved by their own drive mechanisms, such as micro-mobility devices, autonomous mobile robots, ships, and drones, in addition to vehicles. Control of a moving body includes, for example, driving control for autonomously moving the moving body by controlling one or both of steering and speed of the moving body at least temporarily. Control of a moving body may mainly involve manual driving and include giving advice on driving operation by means of voice, display, and the like and performing interference control to some extent. Control of a moving body may include controlling the operation of a protection devices that protect occupants of the moving body. In the following description, it is assumed that a moving body is a vehicle that moves on the ground, and a configuration and functions for making the vehicle move on the ground will be described. Vehicle driving control may include various types of driving control such as automatic driving control such as lane keeping assistance system (LKAS), auto lane changing (ALC), and adaptive cruise control (ACC), and driving assistance control such as contact avoidance control during manual driving, emergency stop control, and lane departure avoidance control.

[Overall Structure]

Figure 1:
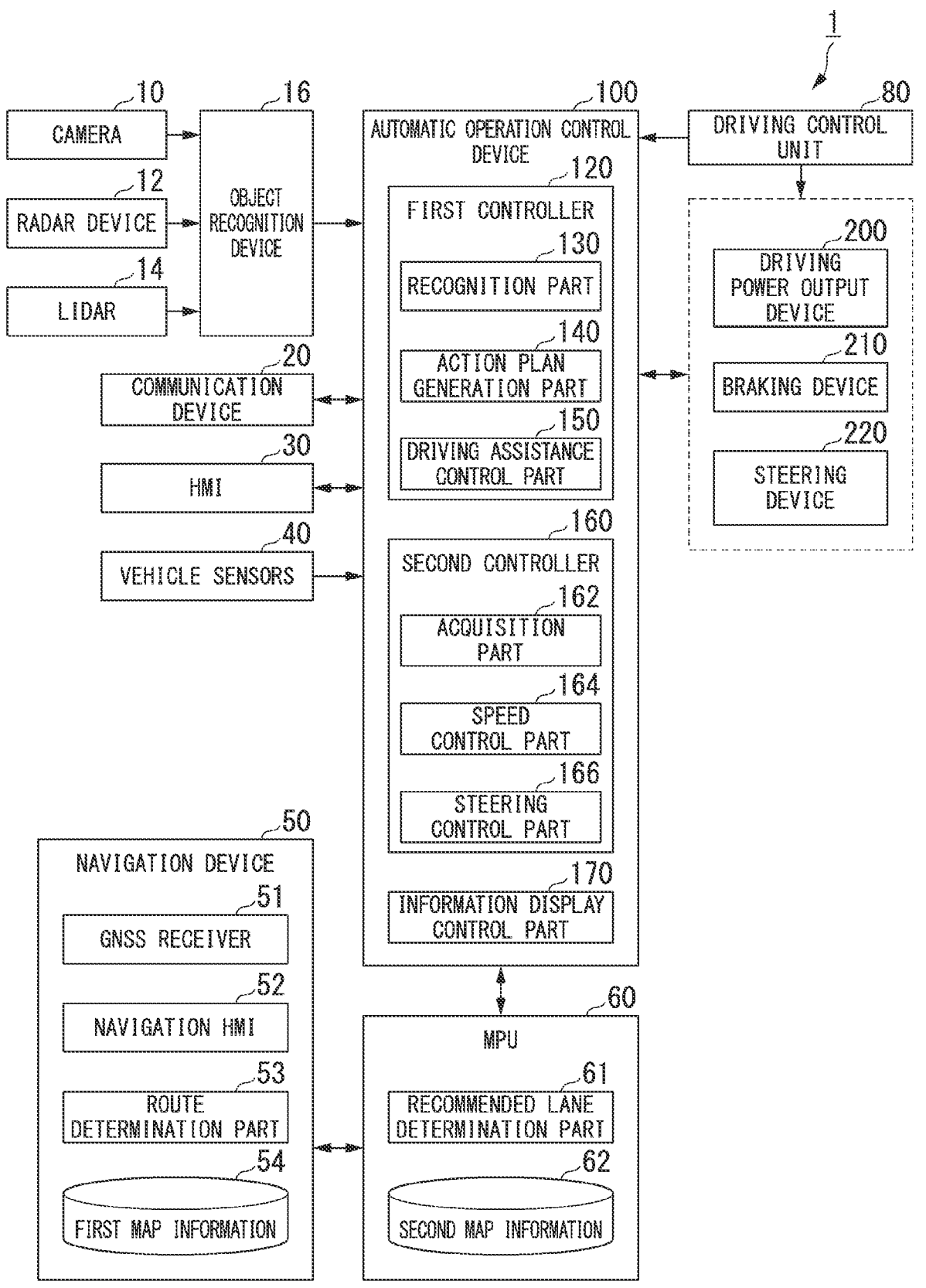
FIG. 1 is a configuration diagram of a vehicle system using a driving assistance apparatus according to an embodiment.

FIG. 1 is a configuration diagram of a vehicle system 1 using a driving assistance apparatus according to an embodiment. A vehicle on which the vehicle system 1 is mounted is, for example, a two-wheeled, three-wheeled, four-wheeled vehicle, or the like and a drive source thereof is an internal combustion engine such as a diesel engine or a gasoline engine, an electric motor, or a combination thereof. The electric motor operates using electric power generated by a generator connected to an internal combustion engine or electric power discharged from a secondary battery or a fuel cell.

The vehicle system 1 includes, for example, a camera 10, a radar device 12, a light detection and ranging (LIDAR) device 14, an object recognition device 16, a communication device 20, a human machine interface (HMI) 30, a vehicle sensor 40, a navigation device 50, a map positioning unit (MPU) 60, a driving control unit 80, an automatic operation control device 100, a driving power output device 200, a braking device 210, and a steering device 220. These devices and apparatuses are connected to each other by a multiplex communication line such as a controller area network (CAN) communication line, a serial communication line, a wireless communication network, and the like. The configuration shown in FIG. 1 is merely an example and part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to an arbitrary location of the vehicle (hereinafter referred to as a host vehicle M) on which the vehicle system 1 is mounted. At the time of capturing a front view image, the camera 10 is attached to the upper part of the front windshield, the rear surface of the rearview mirror, or the like. The camera 10 repeatedly images the surroundings of the host vehicle M periodically, for example. The camera 10 may be a stereo camera.

The radar device 12 radiates radio waves such as millimeter waves around the host vehicle M and detects radio waves (reflected waves) reflected by an object to detect at least the position (distance and direction) of the object. The radar device 12 is attached to an arbitrary location of the host vehicle M. The radar device 12 may detect the position and speed of an object by a frequency modulated continuous wave (FM-CW) method.

The LIDAR device 14 radiates light (or electromagnetic waves having a wavelength close to light) around the host vehicle M and measures scattered light. The LIDAR device 14 detects the distance to an object based on the time from light emission to light reception. The radiated light is, for example, pulsed laser light. The LIDAR device 14 is attached to an arbitrary location of the host vehicles M.

The object recognition device 16 performs sensor fusion processing on detection results of some or all of the camera 10, the radar device 12, and the LIDAR device 14 and recognizes the position, type, speed, and the like of an object. The object recognition device 16 outputs a recognition result to the automatic operation control device 100. The object recognition device 16 may output detection results of the camera 10, the radar device 12, and the LIDAR device 14 to the automatic operation control device 100 as they are. The object recognition device 16 may be omitted from the vehicle system 1.

The communication device 20 communicates with other vehicles present in the vicinity of the host vehicle M using, for example, a cellular network, a Wi-Fi network, Bluetooth (registered trademark), dedicated short range communication (DSRC), or the like or wirelessly communicates with various server devices via a base station.

The HMI 30 presents various types of information to an occupant of the host vehicle M and receives input operations by the occupant. The HMI 30 includes various display devices, speakers, buzzers, touch panels, switches, keys, and the like. That is, the HMI 30 includes an information display part that visually presents information to a driver.

The vehicle sensor 40 includes a vehicle speed sensor that detects the speed of the host vehicle M, an acceleration sensor that detects an acceleration, a yaw rate sensor that detects an angular velocity about a vertical axis, a direction sensor that detects a direction of the host vehicle M, and the like.

The navigation device 50 includes, for example, a global navigation satellite system (GNSS) receiver 51, a navigation HMI 52, and a route determination part 53. The navigation device 50 holds first map information 54 in a storage device such as a hard disk drive (HDD) or a flash memory.

The GNSS receiver 51 identifies the position of the host vehicle M based on signals received from GNSS satellites. That is, the GNSS receiver 51 is a position detection part that detects position information of the host vehicle (host vehicle M). The position of the host vehicle M may be identified or complemented by an inertial navigation system (INS) using the output of the vehicle sensor 40 or may be identified or complemented based on information captured by the camera 10. That is, when the position of the host vehicle M is identified by the INS, the INS may be the position detection part, and when the position of the host vehicle M is identified based on information captured by the camera 10, the camera 10 may be the position detection part.

The navigation HMI 52 includes a display device, a speaker, a touch panel, keys, and the like. The navigation HMI 52 may be partially or entirely shared with the HMI 30 described above. A display device included in the navigation HMI 52 visually presents information to the driver. That is, when the navigation HMI 52 includes a display device, the navigation HMI 52 may be an information display part.

For example, the route determination part 53 determines a route from the position of the host vehicle M identified by the GNSS receiver 51 (or any input position) to a destination input by the occupant using the navigation HMI 52 (hereinafter referred to as a route on a map) with reference to the first map information 54.

The first map information 54 is, for example, information in which road shapes are represented by links indicating roads and nodes connected by the links. The first map information 54 may include road curvature, point of interest (POI) information, and the like. A route on the map is output to the MPU 60. The navigation device 50 may provide route guidance using the navigation HMI 52 based on the route on the map. The navigation device 50 may be realized, for example, by functions of a terminal device such as a smartphone or a tablet terminal carried by the occupant. The navigation device 50 may transmit the current position and a destination to a navigation server via the communication device 20 and acquire a route equivalent to the route on the map from the navigation server.

The MPU 60 includes, for example, a recommended lane determination part 61 and holds second map information 62 in a storage device such as an HDD or a flash memory. The recommended lane determination part 61 divides the route on the map provided from the navigation device 50 into a plurality of blocks (for example, by dividing the route on the map by 100 [m] in a vehicle traveling direction) and determines a recommended lane for each block with reference to the second map information 62. The recommended lane determination part 61 performs determination in such a manner that on which lane from the left the vehicle will travel is determined. The recommended lane determination part 61 determines a recommended lane such that the host vehicle M can travel a rational route to a branch destination when there is a branch point on the route on the map.

The second map information 62 is map information with higher precision than the first map information 54. The second map information 62 includes, for example, lane center information, lane boundary information, and the like. The second map information 62 may include road information, traffic regulation information, address information (addresses/zip codes), facility information, telephone number information, and the like. The second map information 62 may be updated at any time by the communication device 20 communicating with other devices.

The driving control unit 80 includes, for example, an accelerator pedal, a brake pedal, a shift lever, a steering wheel, a deformed steering wheel, a joystick, and other operators. The driving control unit 80 includes a steering element that changes the traveling direction of the host vehicle. A sensor that detects the amount of operation or the presence or absence of an operation is attached to the driving control unit 80, and a detection result is output to the automatic operation control device 100 or some or all of the driving power output device 200, the braking device 210, and the steering device 220.

The automatic operation control device 100 includes, for example, a first controller 120, a second controller 160, and an information display control part 170. Each of the first controller 120, the second controller 160, and the information display control part 170 is realized by a hardware processor such as a central processing unit (CPU) executing a program (software). Some or all of these components may be realized by hardware (circuit part including a circuitry) or, for example, a large scale integration (LSI) device, an application specific integrated circuit (ASIC), a field-programmable gate array (FPGA), or a graphics processing unit (GPU) is realized by software and hardware in cooperation. The program may be stored in advance in a storage device (a storage device including a non-transitory storage medium) such as an HDD or a flash memory of the automatic operation control device 100, or may be stored in a detachable storage medium such as a DVD or a CD-ROM and installed in an HDD or a flash memory of the automatic operation control device 100 by setting the storage medium (non-transitory storage medium) in a drive device. The automatic operation control device 100 is an example of a "vehicle control device" and a combination of the GNSS receiver 51, the driving control unit 80, a recognition part 130, a driving assistance control part 150, and the information display control part 170 is an example of a "driving assistance apparatus."

Next, details of the first controller 120, the second controller 160, and the information display control part 170 will be described. The first controller 120 includes, for example, the recognition part 130, an action plan generation part 140, and the driving assistance control part 150. The first controller 120 realizes functions according to artificial intelligence (AI) and functions according to a model provided in advance in parallel, for example. For example, a function of "recognizing an intersection" executes recognition of the intersection by deep learning, and the like, and recognition based on predetermined conditions (signals that can be pattern-matched, road markings, and the like) in parallel, and may be realized by scoring both and evaluating comprehensively. This ensures the reliability of automated driving.

The recognition part 130 recognizes the position and states, for example, a speed and an acceleration of an object around the host vehicle M based on information input from the camera 10, the radar device 12, and the LIDAR device 14 via the object recognition device 16. The position of the object is recognized, for example, as a position on absolute coordinates having a representative point (the center of gravity, the center of the drive shaft, or the like) of the host vehicle M as the origin and used for control. The position of the object may be represented by a representative point such as the center of gravity or a corner of the object or may be represented by a represented area. "States" of the object may include an acceleration and jerk of the object, or "behavior state" (e.g., whether or not lanes are being changed or attempted to be changed).

The recognition part 130 recognizes, for example, a lane (traveling lane) in which the host vehicle M is traveling or is scheduled to travel. For example, the recognition part 130 recognizes a driving lane by comparing a pattern of road markings obtained from the second map information 62 (for example, an array of solid lines and broken lines) and a pattern of road markings around the host vehicle M recognized from images captured by the camera 10. The recognition part 130 may recognize the driving lane by recognizing lane boundaries (road boundaries) including road markings, road shoulders, curbs, medians, guardrails, and the like in addition to road markings. In this recognition, the position of the host vehicle M acquired from the navigation device 50 and the processing result by the INS may be taken into consideration. The recognition part 130 recognizes stop lines, obstacles, red lights, toll booths, and other road events. That is, the recognition part 130 functions as a road shape recognition part that recognizes the shape of the road on which the host vehicle (host vehicle M) is scheduled to travel.

The recognition part 130 recognizes the position and attitude of the host vehicle M with respect to a driving lane at the time of recognizing the driving lane. For example, the recognition part 130 may recognize an angle to a line connecting a deviation of a reference point of the host vehicle M from the center of a lane and the center of the lane in the traveling direction of the host vehicle M as a relative position and attitude of the host vehicle M with respect to the driving lane. Instead, the recognition part 130 may recognize the position of the reference point of the host vehicle M with respect to any one of the side edges of the driving lane (road marking or road boundary), or the like as a relative position of the host vehicle M with respect to the driving lane.

The action plan generation part 140 generates a target trajectory along which the host vehicle M will automatically travel (without depending on operations of the driver) in the future such that the host vehicle M travels in a recommended lane determined by the recommended lane determination part 61 in principle, and furthermore, can cope with a surrounding situation of the host vehicle M. The target trajectory includes, for example, a speed element. For example, the target trajectory is represented by arranging points (trajectory points) that the host vehicle M will reach in order. A trajectory point is a point that the host vehicle M will reach for each predetermined travel distance (for example, about several [m]) along a road, and separately, a target speed and a target acceleration are generated as parts of the target trajectory for each predetermined sampling time (for example, about several tens of a second). The trajectory point may be a position that the host vehicle M will reach at each predetermined sampling time. In this case, the information on the target speed and target acceleration is represented as intervals between trajectory points.

The action plan generation part 140 may set an automatic driving event in generation of the target trajectory. Automatic driving events include a constant-speed driving event, a low-speed following driving event, a lane change event, a branching event, a merging event, a takeover event, and the like. The action plan generation part 140 generates a target trajectory according to an activated event.

The driving assistance control part 150 assists the driver who operates the host vehicle M. The driving assistance control part 150 assists lane change by scanning the accelerator pedal, the brake pedal, the shift lever, the steering wheel, and the like according to circumstances around the host vehicle M when the host vehicle M needs to change lanes in particular. Specifically, the driving assistance control part 150 controls the driving control unit 80 such that the host vehicle M changes lanes based on information regarding the position of the host vehicle M identified by the GNSS receiver 51 and information regarding a road shape recognized by the recognition part 130.

The second controller 160 controls the driving power output device 200, the braking device 210, and the steering device 220 such that the host vehicle M passes through a target trajectory generated by the action plan generation part 140 at a scheduled time.

The second controller 160 includes, for example, an acquisition part 162, a speed control part 164, and a steering control part 166. The acquisition part 162 acquires information on a target trajectory (trajectory points) generated by the action plan generation part 140 and stores the information in a memory (not shown). The speed control part 164 controls the driving power output device 200 or the braking device 210 based on a speed element associated with the target trajectory stored in the memory. The steering control part 166 controls the steering device 220 according to a degree of the curve of the target trajectory stored in the memory. Processing of the speed control part 164 and the steering control part 166 is realized by, for example, a combination of feedforward control and feedback control. As an example, the steering control part 166 combines and executes feedforward control according to the curvature of the road ahead of the host vehicle M and feedback control based on a deviation from the target trajectory.

The information display control part 170 controls display devices such as the HMI 30 and the navigation HMI 52 such that they visually present information to the driver.

The driving power output device 200 outputs a driving power (torque) for the vehicle to travel to the driving wheels. The driving power output device 200 includes, for example, a combination of an internal combustion engine, an electric motor, a transmission, and the like and an electronic control unit (ECU) that controls these components. The ECU controls the aforementioned components according to information input from the second controller 160 or information input from the driving control unit 80.

The braking device 210 includes, for example, a brake caliper, a cylinder that transmits a hydraulic pressure to the brake caliper, an electric motor that generates hydraulic pressure in the cylinder, and a brake ECU. The brake ECU controls the electric motors according to information input from the second controller 160 or information input from the driving control unit 80 such that a brake torque corresponding to a braking operation is output to each wheel. The braking device 210 may include, as a backup, a mechanism that transmits a hydraulic pressure generated by operating the brake pedal included in the driving control unit 80 to the cylinder via a master cylinder. The braking device 210 is not limited to the configuration described above and may be an electronically controlled hydraulic braking device that controls an actuator according to information input from the second controller 160 to transmit a hydraulic pressure of the master cylinder to the cylinder.

The steering device 220 includes, for example, a steering ECU and an electric motor. The electric motor applies force to a rack and pinion mechanism to change the direction of steered wheels, for example. The steering ECU drives the electric motor according to information input from the second controller 160 or information input from the driving control unit 80 to change the direction of the steered wheels.

[Processing when One Lane Change is Involved]

Figure 2:
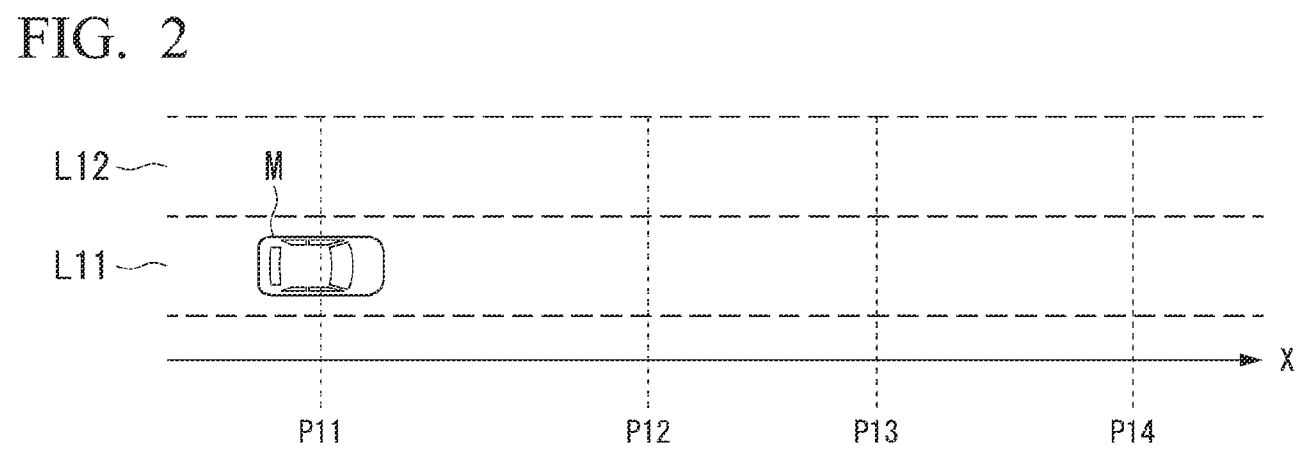

FIG. 2 is a diagram for describing processing in which one lane change is involved in a driving assistance method according to an embodiment. Processing of the driving assistance apparatus when one lane change is involved will be described with reference to FIG. 2. This figure shows an example of a case in which the host vehicle M moves from the right lane to the left lane. The host vehicle M is currently located in a first lane L11. When the host vehicle M moves from the right lane to the left lane, the host vehicle M changes lanes from the first lane L11 to the second lane L12 at a predetermined position or timing. In the description given with reference to this figure, the position of the host vehicle M may be described based on the horizontal axis x. The current position of host vehicle M is indicated as a position P11.

The host vehicle M changes lanes from the first lane L11 to the second lane L12 according to either an operation by the driver or automatic lane change by the vehicle system 1. Here, points where the vehicle system 1 can perform automatic lane change include limit points where it is impossible to change lanes with a margin without abrupt steering or acceleration/deceleration after passing through a specific point. A specific point is, for example, a point present in cases in which the number of available lanes decreases such as cases in which one lane is closed to traffic due to road construction and cases in which a broken-down vehicle is parked in one lane.

Here, when the position of the host vehicle M has passed through a specific point, it may be possible to change lanes according to an operation of the driver even if the position of the host vehicle M has passed through the specific point. Furthermore, there is a limit point at which the operation of the driver does not allow the host vehicle M to change lanes with a margin when the host vehicle M has passed through the specific point. Therefore, the driving assistance apparatus identifies a point where lane change with a margin can be performed by the vehicle system 1 and a point where lane change can be performed according to an operation of the driver and presents a distance or time to both of the identified points to the driver. Specific processing will be described below.

First, the driving assistance apparatus identifies a target point which is a point at which the host vehicle M needs to complete lane change. An example of the target point is indicated as a position P14 in the figure. Traffic on the first lane L11 on the right side of the target point is prohibited for some reason. Therefore, the host vehicle M needs to perform lane change from the first lane L11 to the second lane L12 according to either an operation of the driver or automatic lane change by the vehicle system 1 at least at a point before the position P14 (a point located on the left side of the position P14 in the figure). The target point is specifically identified by the driving assistance control part 150. Since the target point is identified according to road construction or a broken vehicle, it may be difficult to identify it in advance. Accordingly, it is desirable to identify the target point based on a situation imaged by the host vehicle M. Therefore, more specifically, the target point may be identified based on the shape of a road recognized by the recognition part 130. That is, the driving assistance control part 150 identifies a target point at which lane change needs to be completed based on the shape of a road recognized by the recognition part (road shape recognition part) 130.

The driving assistance control part 150 identifies the target point described above and determines a first point which is a point between the target point and the host vehicle M. An example of the first point is indicated as a position M. An example of the first point is indicated as a position P12 in the figure. The first point is a critical point of points where lane change according to automatic driving by the driving assistance control part 150 can be performed. That is, it can be said that the driving assistance control part 150 performs lane change by automatic driving up to the first point and does not perform lane change by automatic driving after passing through the first point.

Further, the driving assistance control part 150 determines a second point. The second point is a point between the target point and the host vehicle M and is closer to the target point than the first point. An example of the second point is indicated as a position P13 in the figure. The second point is a critical point of points where lane change according to manual driving of the driver can be performed. The driving assistance control part 150 recommends lane change by the driver operating the driving control unit (steering element) 80 at a point at which or during a period in which lane change can be performed by manual driving of the driver. That is, the driving assistance control part 150 recommends lane change by the driver operating the steering element up to the second point and does not recommend lane change by the driver operating the steering element beyond the second point.

Here, the distance from the target point to the second point is a distance that allows the driver to change lanes with a margin. For example, if there is an accident vehicle at the target point, it is desirable for the driver to change lanes at least several meters [m] before the accident vehicle, and thus it is desirable that the target point be set at least several [m] before the accident vehicle. However, depending on the situation, there may be cases where it is not necessary to set a distance with a margin. Therefore, when it is not necessary to set a distance with a margin, the second point and the target point may be the same point. Illustration of a case where the second point and the target point are the same point is omitted.

Next, an example of a display screen displayed by the information display control part 170 will be described with reference to FIGS. 3 to 5. The example shown in the figure is an example of a display screen displayed on the HUD, for example.

Figure 3:
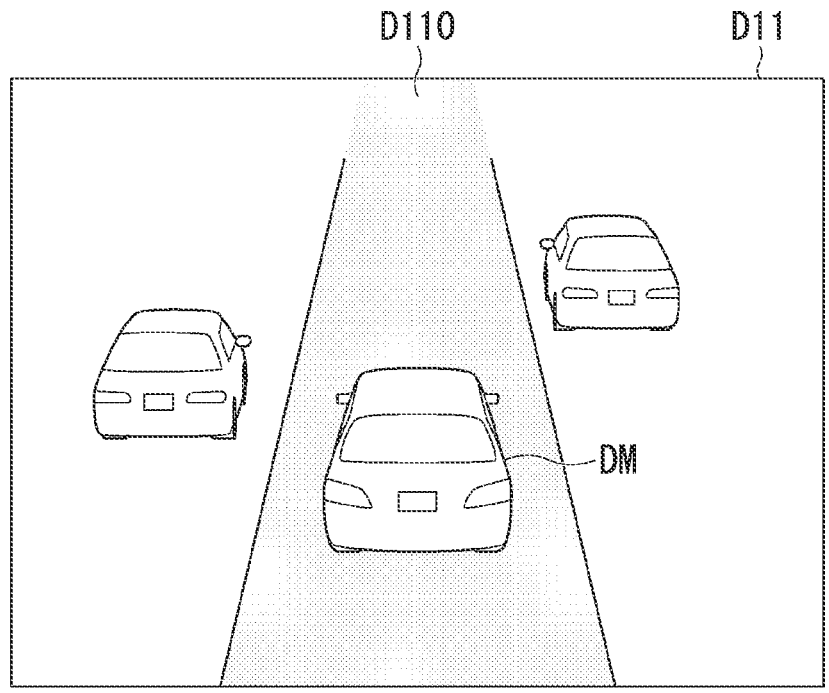
FIG. 3 is a diagram showing an example of a display screen displayed by the driving assistance apparatus according to the embodiment when lane change is not involved.

FIG. 3 is a diagram showing an example of a display screen displayed by the driving assistance apparatus according to the embodiment when lane change is not involved. An example of a display screen P11 will be described with reference to the figure. The display screen P11 shows a lane in which the host vehicle M is traveling and lanes to which the host vehicle M can change lanes.

The information display control part 170 displays the display screen P11 shown in the figure when lane change is not involved. The information display control part 170 displays the position of the host vehicle M as a symbol DM in order to cause the driver to recognize the lane in which the host vehicle M is traveling. The information display control part 170 may not necessarily display the symbol DM if the driver can be caused to recognize the lane in which the host vehicle M is traveling. In FIG. 3, it can be ascertained that the host vehicle M is traveling in the center lane among the three lanes.

The information display control part 170 displays the symbol D110 as an element for recognizing the lane in which the host vehicle M is traveling. The symbol D110 has a shape along the lane displayed on the information display control part 170 and has a color different from the color used to display other lanes in which the host vehicle M is not traveling such that the driver recognizes the lane in which the host vehicle M is traveling. In the example shown in FIG. 3, the lane where the symbol DM is positioned and the lane where the symbol D110 is displayed match, and thus the driver can recognize that there is no need to change lanes. The information display control part 170 may display other vehicles on the display screen P11 in order to make it possible to recognize that the other vehicles are traveling in the vicinity of the host vehicle M. In the example shown in FIG. 3, one vehicle is traveling in the left lane and one vehicle is traveling in the right lane as other vehicles.

Figure 4:
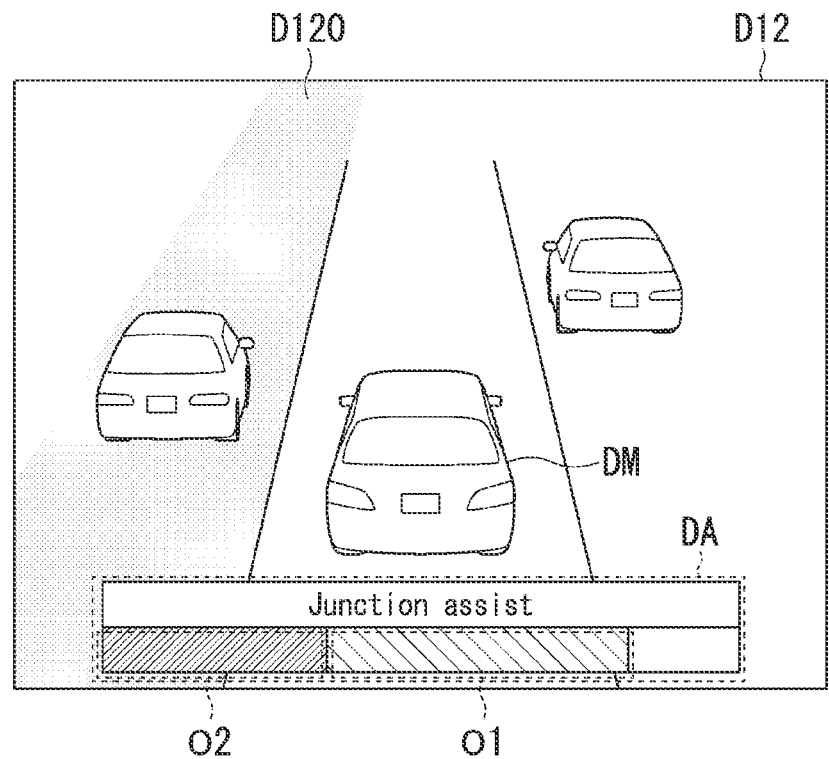
FIG. 4 is a diagram showing an example of a display screen displayed by the driving assistance apparatus according to the embodiment at the time of changing lanes.

FIG. 4 is a diagram showing an example of a display screen displayed by the driving assistance apparatus according to the embodiment at the time of changing lanes. An example of a display screen P12 will be described with reference to the figure. The display screen P12 displays a distance or a time to a point where lane change can be performed in addition to the lane in which the host vehicle M is traveling and lanes to which the host vehicle M can change lanes. The display screen P12 differs from the display screen P11 in that a display area DA is displayed. The display area DA has a predetermined size for representing information on a distance or a time and is controlled by the information display control part 170. That is, the information display control part 170 displays the display area DA having a predetermined size for representing information on a distance or a time. In description of the display screen P12, the screen configuration similar to that of the display screen P11 may be denoted by the same reference numerals and the description thereof may be omitted.

The information display control part 170 displays the display screen P12 shown in the figure when lane change is involved. In the example shown in the figure, the host vehicle M is traveling in the middle lane of the three lanes and needs to change lanes to the left lane. The information display control part 170 displays a symbol D120 as an element for recognizing the lane to which the host vehicle M changes lanes. The symbol D120 has a shape along the lane displayed in the information display control part 170 and has a color different from the color used to display lanes other than the lane to which the host vehicle M changes lanes such that the driver recognizes the lane to which the host vehicle M will change lanes. In the example shown in FIG. 4, the lane where the symbol DM is positioned and the lane where the symbol D120 is displayed are different, and thus the driver can recognize that it is necessary to change lanes. The driving assistance apparatus may issue a voice notification to make the driver to recognize that it is necessary to change lanes.

After determining a target point, the first point, and the second point, the information display control part 170 controls the HUD such that the HUD performs display in accordance with the target point, the first point, and the second point. Display in accordance with the target point, first point, and second point includes at least information on the distance or time from the position of the host vehicle to the first point and information on the distance or time from the position of the host vehicle to the second point. Specifically, the information display control part 170 displays the information on the distance or time from the position of the host vehicle M to the first point and the information on the distance from the position of the host vehicle M to the second point by displaying the display area DA.

The display area DA has a first object O1 and a second object O2 as screen components. The first object O1 displays information on the distance or time from the current position of the host vehicle M to the first point by a predetermined method. The second object O2 displays information on the distance or time from the first point to the second point by a predetermined method.

In the example shown in FIG. 4, the first object O1 and the second object O2 are displayed by indicators. The first object O1 has a size corresponding to the distance or time from the host vehicle M to the first point. The second object O2 has a size corresponding to the distance or time from the first point or the point where the host vehicle M is present to the second point. That is, the information display control part 170 displays the first object O1 having a size corresponding to the distance or time to the first point and the second object O2 having a size corresponding to the distance or time to the second point in the display area DA. The first object O1 and the second object O2 may be displayed anywhere on the display screen D12. For example, the first object O1 and the second object O2 may be independently displayed at different positions. The first object O1 and the second object O2 may be displayed in different colors. For example, the second object O2 may be displayed in a color with a higher degree of warning than that of the first object O1. Specifically, the first object O1 may be displayed in green and the second object O2 may be displayed in yellow.

In the example shown in FIG. 4, both the first object O1 and the second object O2 are rectangular. However, the shapes of the first object O1 and the second object O2 are not limited to rectangles. It is desirable that the shapes of the first object O1 and the second object O2 be a band or linear shape, for example. Here, the band or linear shape is not limited to a rectangle or a straight line and includes a wide range of continuous shapes such as circular arcs. When the first object O1 and the second object O2 have a band or linear shape, the first object O1 and the second object O2 can be displayed continuously in a longitudinal direction (or continuous direction). That is, the information display control part 170 continuously arranges and displays the first object O1 in a band or linear shape and the second object O2 in a band or linear shape in the longitudinal direction.

Figure 5:
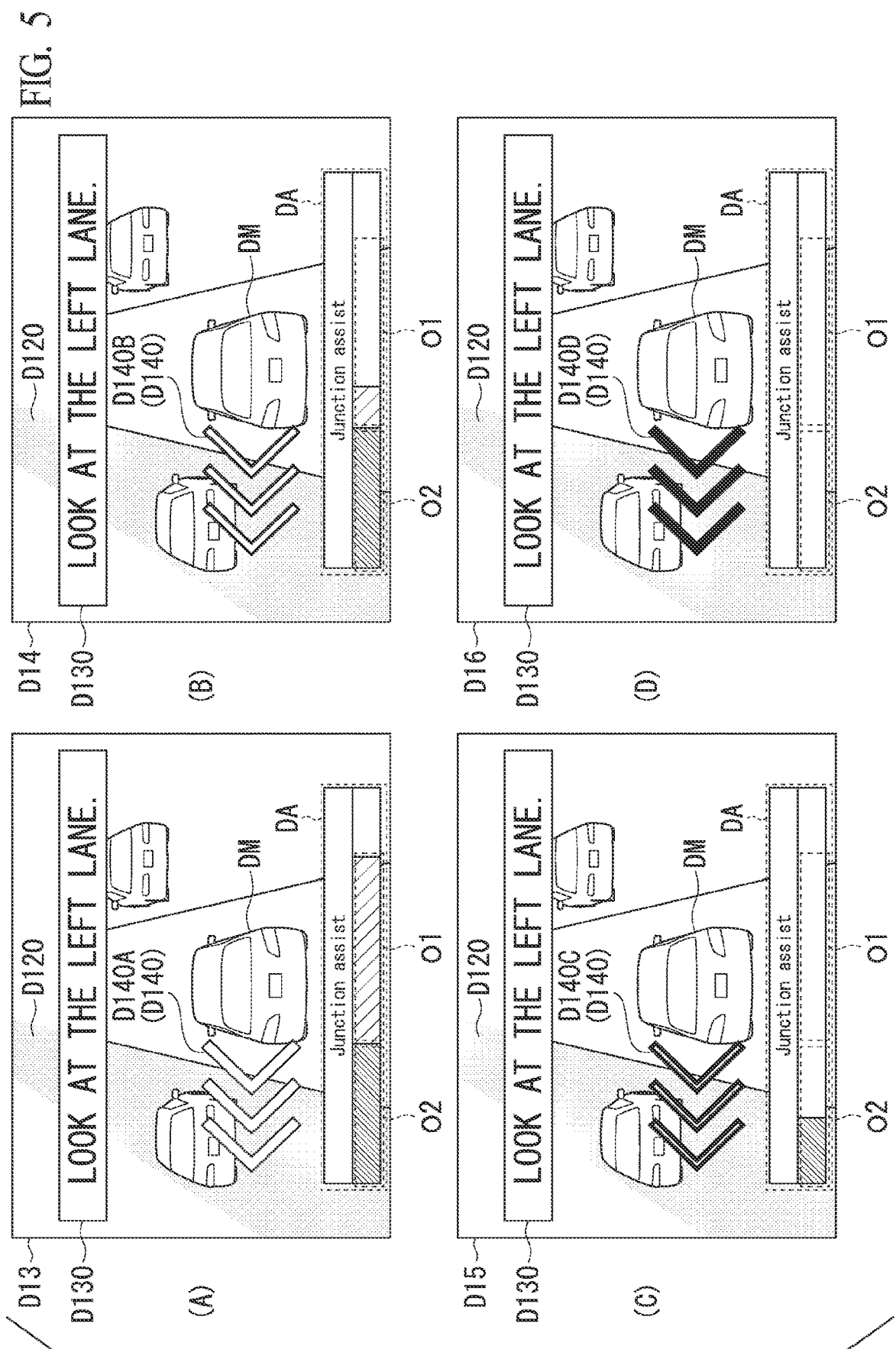
FIG. 5 is a diagram showing an example of a display screen displayed by the driving assistance apparatus according to the embodiment at the time of changing lanes.

FIG. 5 is a diagram showing a display screen displayed by the driving assistance apparatus according to the embodiment and shows an example of changes in the display screen when at the time of changing lanes. An example of changes in the display screen P12 at the time of changing lanes will be described with reference to the figure.

FIG. 5(A) shows an example of a display screen displayed at a point where the driving assistance apparatus starts lane change. The information display control part 170 may display a display screen D13 from, for example, 2 kilometers (km) before a target point. A symbol D130 and a symbol D140 are displayed on the display screen D13 in addition to the display area DA described above. The symbol D130 is a display for prompting checking of the left lane when lane change to the left lane is performed according to the system and, for example, text such as "Please check the left lane" is displayed. The driving assistance apparatus may output a voice prompting checking of the left lane along with the display of the symbol D130. The symbol D140 is a visual display for causing the driver to recognize lane change to the left lane. The symbol D140 may include, for example, three inequality symbols.

Although an example of a lane change from the center lane to the left lane is described in the description with reference to FIG. 5, the present embodiment can also be applied to a lane change to the right lane. In the lane change to the right lane, the symbol D120 is displayed in accordance with the shape of the right lane. The symbol D130 is a display for prompting checking of the right lane when the lane change to the right lane is performed according to the system. For example, text such as "Please check the right lane" is displayed. In lane change to the right lane, the shape of the inequality symbols of symbol D140 is configured symmetrically.

FIG. 5(B) shows an example of a display screen displayed when the host vehicle M is present in front of the first point. In other words, a case in which the host vehicle M is present in front of the first point is a case in which the distance from the target point to the host vehicle is greater than the distance from the target point to the first point. The display screen D14 shows an example in a case where the host vehicle M has traveled several hundred [m] after the display area DA is displayed. In the description of the display screen D14, the same components as those of the display screen D13 may be denoted by the same reference numerals and the description thereof may be omitted.

The information display control part 170 updates display of the display area DA according to the position of the host vehicle M. When the host vehicle M is present in front of the first point, the information display control part 170 changes the area of the first object O1 according to the distance or time from the host vehicle M to the first point. Therefore, as the host vehicle M approaches the first point, the size of the first object O1 gradually decreases. Since the position of the host vehicle M when the display screen D14 is displayed is closer to the first point than the position of the host vehicle M when the display screen D13 is displayed, the size of the first object O1 in the display screen D14 is less than the size of the first object O1 in the display screen D13.

The information display control part 170 does not change the size of the second object O2 when the host vehicle M is present in front of the first point. Specifically, when the host vehicle M is present in front of the first point, the information display control part 170 sets the area of the second object O2 to a certain area in accordance with the distance or time from the first point to the second point and displays the second object O2.

The information display control part 170 may change the shape of the symbol D140 as the host vehicle M approaches the first point. For example, compared to a symbol D140A in the display screen D13, a symbol D140B in the display screen D14 strongly emphasizes the movement to the left lane by thickening the frame line constituting the symbol.

FIG. 5(C) shows an example of a display screen displayed when the host vehicle M is present between the first point and the second point. A display screen D15 shows an example in which lane change cannot be performed according to the system even though the vehicle has passed through the first point. In such a case, it is necessary to change lanes by an operation of the driver. In the description of the display screen D15, the same components as those of the display screen D14 may be denoted by the same reference numerals and the description thereof may be omitted.

When the host vehicle M is present between the first point and the second point, the information display control part 170 does not display the first object O1 or displays the first object O1 whose area gradually decreases in a manner in which it can be ascertained that the size has become zero. According to this display, the driver can recognize that the distance or time allowing lane change according to the system has elapsed.

When the host vehicle M is present between the first point and the second point, the information display control part 170 changes the area of the second object O2 in accordance with the distance or time from the host vehicle M to the second point. Therefore, when the host vehicle M is present between the first point and the second point, the size of the second object O2 gradually decreases as the host vehicle M approaches the second point. Since the position of the host vehicle M when the display screen D15 is displayed is closer to the second point than the position of the host vehicle M when the display screen D14 is displayed, the size of the second object O2 in the display screen D15 is less than the size of the second object O2 in the display screen D14.

The information display control part 170 may change the shape of the symbol D140 as the host vehicle M approaches the second point. For example, compared to a symbol D140B in the display screen D14, a symbol D140C in the display screen D15 strongly emphasizes the movement to the left lane by thickening the frame line constituting the symbol.

FIG. 5(D) shows an example of a display screen displayed when the host vehicle M has passed through the target point. A display screen D16 is a screen that is not displayed in a normal operation because the host vehicle M must have finished lane change by the target point. Since the host vehicle M has passed through the target point, both the first object O1 and the second object O2 have become zero in the display screen D16. When the host vehicle M has passed through the target point, the driving assistance apparatus displays the display screen D16 and then ends processing.

[Processing when Multiple Lane Changes are Involved]

Figure 6:
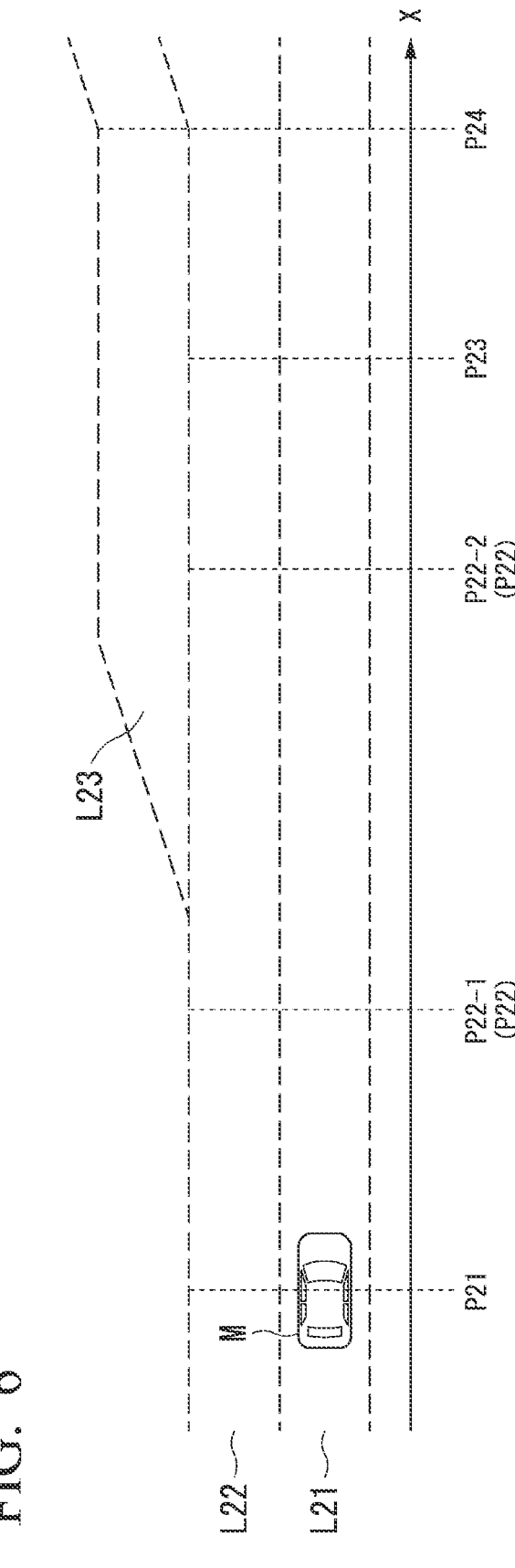
FIG. 6 is a diagram for describing processing when multiple lane changes are involved in the driving assistance method according to the embodiment.

FIG. 6 is a diagram for describing a driving assistance method according to an embodiment and processing when multiple lane changes are involved. Processing of the driving assistance apparatus when multiple lane changes are involved will be described with reference to the figure. As an example of processing of the driving assistance apparatus when multiple lane changes are involved, processing of the driving assistance apparatus when two lane changes are involved will be described. Processing described in the figure is an example of a case where multiple times of processing are involved, and the same processing can also be applied when three or more lane changes are involved. This figure shows an example of a case where the host vehicle M moves from the right lane to the left lane. The host vehicle M is currently located in a first lane L21. When the host vehicle M moves from the right lane to the left lane, the host vehicle M changes lanes from the first lane L21 to a second lane L22 and further to a third lane L23 at a predetermined position or timing. In the description given with reference to the figure, the position of the host vehicle M may be described based on the horizontal axis x. The current position of the host vehicle M is indicated as a position P21.

The host vehicle M performs a total of two lane changes from the first lane L21 to the second lane L22 and further to the third lane L23 by either an operation of the driver or automatic lane change by the vehicle system 1. Even if the number of lane changes increases, there is one target point, which is the same as the example described with reference to FIG. 2, and thus description thereof will be omitted. An example of the target point is indicated as a position P24 in the figure. In the example shown in FIG. 6, the target point is a branch point of a lane. A branch point of a lane is, for example, an exit branch point on a highway. Therefore, at least at a point before the position P24 (a point located on the left side of the position P24 in the figure), the host vehicle M needs to change lanes from the first lane L21 to the third lane L23 by either an operation by the driver or an automatic lane change by the vehicle system 1.

When multiple lane changes are involved, the driving assistance control part 150 determines a number of first points according to the number of lane changes at the time of determining the first points. Since the present embodiment involves two lane changes, two first points are determined. Specifically, the driving assistance control part 150 determines a position P22-1 and a position P22-2 as the positions P22 of the first points. The position P22-1 is a critical point at which the first lane change can be performed according to the system, and the position P22-2 is a critical point at which the second lane change can be performed according to the system. More specifically, the position P22-1 is a final point at which lane change to the left lane should be performed according to the system in order to move to a branch road, and the position P22-2 is a final point at which lane change to the branch road can be performed according to the system.

Furthermore, the driving assistance control part 150 determines the second point. The number of second points does not change by the number of lane changes and there is only one point. An example of the second point is indicated as a position P23 in the figure. Although the second lane change can be performed by the driver operating the steering element up to the position P23 because the second point is a critical point where lane change can be performed by manual driving of the driver, it is not recommended to change lanes when the host vehicle M has passed through the position P23. That is, the driving assistance control part 150 recommends lane change by the driver operating the steering element up to the position P23 which is the second point and does not recommend lane change by the driver operating the steering element when the host vehicle M has passed through the position P23 which is the second point.

Next, control of the information display control part 170 when multiple lane changes are involved will be described. The description of the same processing as in the case of one lane change may be omitted. First, as an example, a total length obtained by adding the length of the first object O1 and the length of the second object O2 is the distance from the current position P21 of the host vehicle M to the second position P23. The length of the first object O1 is the distance from the position P21, which is the current position of the host vehicle M, to the position P22-1, which is the first position. The length of the second object O2 is the distance from the position P22-1, which is the first point, to the position P23, which is the second point, when the host vehicle M does not pass through the first point. The length of the second object O2 is the distance from the current point of the host vehicle M to the position P23, which is the second point, when the host vehicle M has passed through the first point.

That is, since two lane changes are required in the example shown in FIG. 6, the distance to the point where lane change can be performed according to the system is set with a margin by setting two first points in consideration of two lane changes and displaying a distance to a first point close to the host vehicle M using an indicator. When multiple lane changes are required, the information display control part 170 sets the distance to the point where lane change can be performed according to the system with a margin by increasing the area of the second object O2. That is, the information display control part 170 set the area of the second object O2 when multiple lane changes are required to reach the target point to be greater than the area of the second object O2 when one lane change is required to reach the target point.

[First Modified Example of Display Screen]

Figure 7:
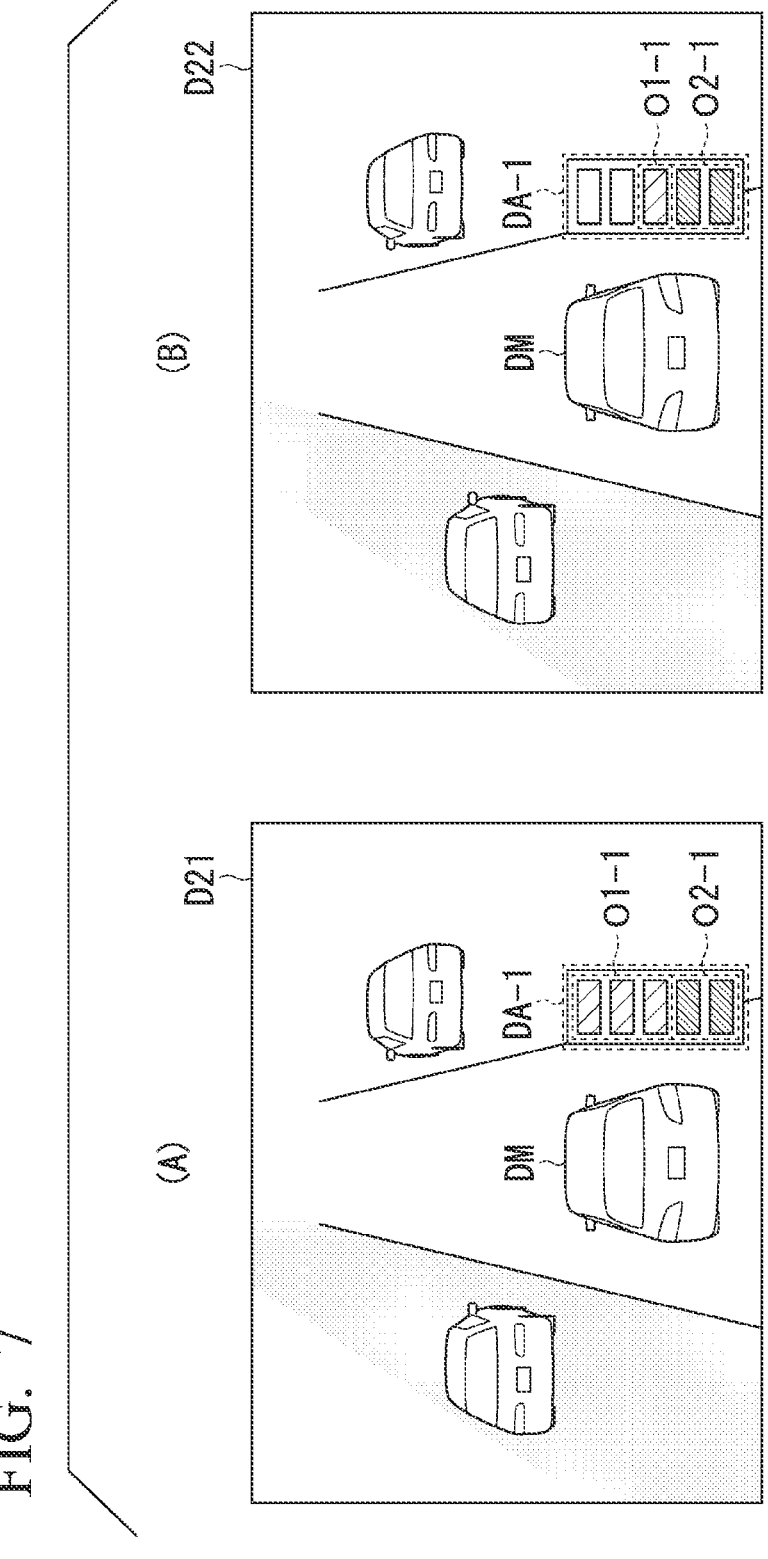
FIG. 7 is a diagram showing a first modified example of a display screen displayed by the driving assistance apparatus according to the embodiment.

FIG. 7 is a diagram showing a first modified example of a display screen displayed by the driving assistance apparatus according to the embodiment. A display screen D21 and a display screen D22 which are a first modified example of a display screen displayed by the information display control part 170, will be described with reference to the figure. The display screen D21 is an example of a display screen displayed at a point where the driving assistance apparatus starts lane change. That is, the display screen D21 is a modified example of the display screen D13 described above. The display screen D22 is an example of a display screen displayed when the host vehicle M is present in front of the first point. That is, the display screen D22 is a modified example of the display screen D14 described above.

As shown in the display screen D21 and the display screen D22, the first modified example differs from the above-described example in that a display area DA-1 is provided instead of the display area DA. The display area DA-1 has a first object O1-1 and a second object O2-1 as screen components. The display area DA differs from the display area DA-1 in that the former is a horizontally oriented indicator whereas the latter is a vertically oriented indicator. The display area DA-1 is displayed, for example, next to the host vehicle M indicated by the symbol DM. The first object O1-1 has a size corresponding to the distance or time from the host vehicle M to the first point, and the area or length thereof changes in the vertical direction according to the distance or time from the host vehicle M to the first point. The second object O2-1 has a size corresponding to the distance or time from the first point or the point at which the host vehicle M is present to the second point, and the area or length thereof changes in the vertical direction according to the distance or time from the first point or the point at which the host vehicle M is present to the second point.

[Second Modified Example of Display Screen]

Figure 8:
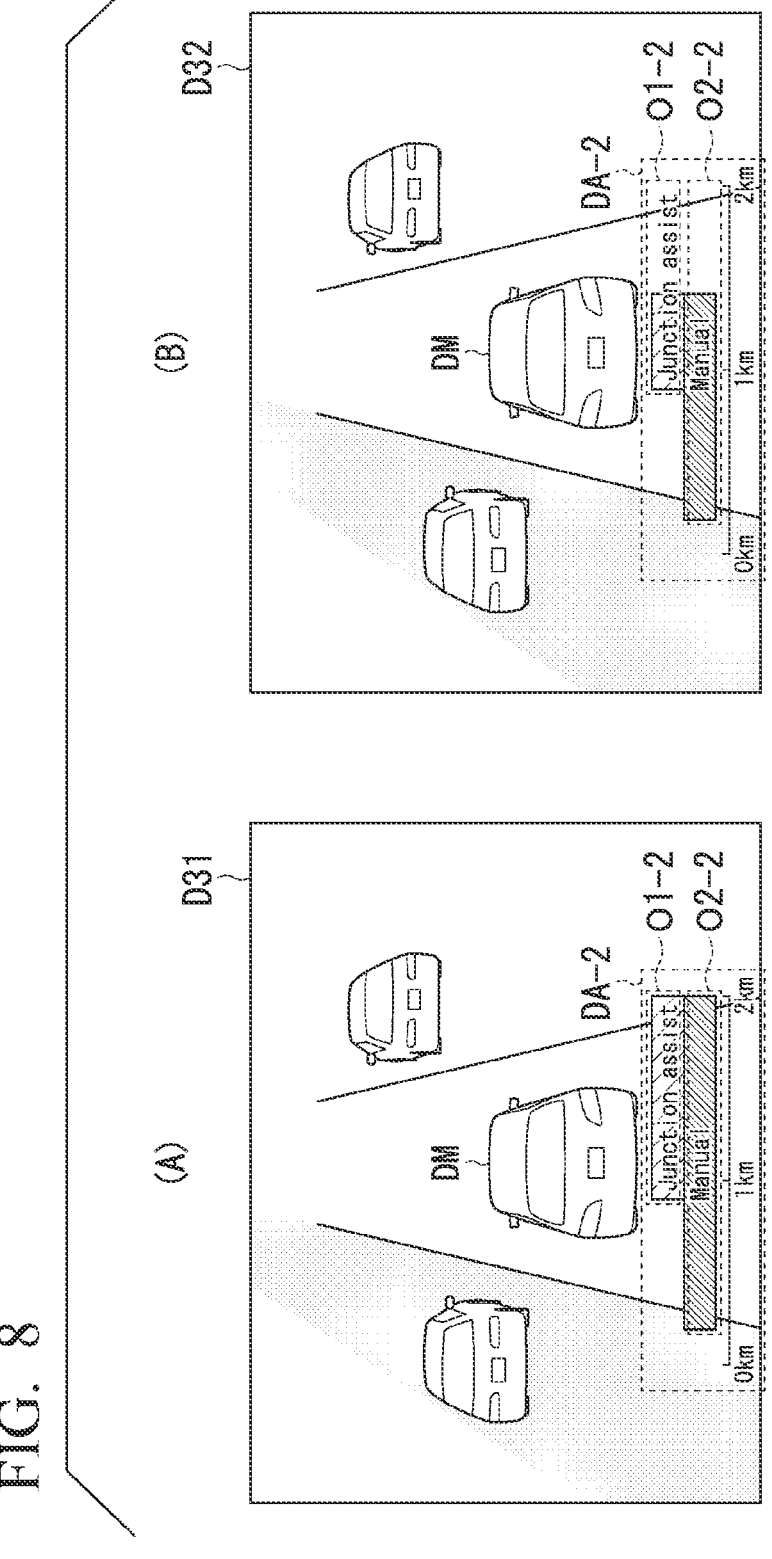
FIG. 8 is a diagram showing a second modified example of a display screen displayed by the driving assistance apparatus according to the embodiment.

FIG. 8 is a diagram showing a second modified example of a display screen displayed by the driving assistance apparatus according to the embodiment. A display screen D31 and a display screen D32, which are a second modified example of a display screen displayed by the information display control part 170, will be described with reference to the figure. The display screen D31 is an example of a display screen displayed at a point where the driving assistance apparatus starts lane change. That is, the display screen D31 is a modified example of the display screen D13 described above. The display screen D32 is an example of a display screen displayed when the host vehicle M is present in front of the first point. That is, the display screen D32 is a modified example of the display screen D14 described above.

As shown in the display screen D31 and the display screen D32, the second modified example differs from the above-described example in that a display area DA-2 is provided instead of the display area DA. The display area DA-2 has a first object O1-2 and a second object O2-2 as screen components. The display area DA differs from the display area DA-2 in that the former arranges the first object O1 and the second object O2 in a continuous direction whereas the latter arranges the first object O1-2 and the second object O2-2 in a parallel direction. The first object O1-2 and the second object O2-2 have different areas, and the first object O1-2 is smaller than the second object O2-2. The areas of both the first object O1 and the second object O2 are changed by moving the positions of the right ends thereof to the left. The right end of the first object O1 and the right end of the second object O2 move to the left at the same speed according to the position of the host vehicle M. In the present embodiment, the point at which the area of the first object O1 becomes zero is the first point.

SUMMARY OF EMBODIMENT

According to the embodiment described above, the driving assistance apparatus detects position information of the host vehicle by including a position detection part, recognizes the shape of the road on which the host vehicle is scheduled to travel by including a road shape recognition part, changes a traveling direction of the host vehicle by including a steering element, controls the steering element such that the host vehicle changes lanes based on the position information detected by the position detection part and the shape of the road recognized by the road shape recognition part by including a driving assistance control part, and visually presents information to a driver driving the host vehicle by including an information display control part. The driving assistance control part identifies a target point at which lane change needs to be completed based on the shape of the road recognized by the road shape recognition part and additionally determines a first point between the target point and the host vehicle and a second point, which is a point between the target point and the host vehicle and is closer to the target point than the first point or is the same as the target point. The information display control part displays information on the distance or time from the position of the host vehicle to the first point and information on the distance or time from the position of the host vehicle to the second point. That is, the driving assistance apparatus displays the distances or times to two points. Therefore, according to the driving assistance apparatus, it is possible to reduce a psychological stress of the driver, such as impatience, at the time of changing lanes by presenting the distances or times from the host vehicle to the first point and the second point to the driver in such a manner that the driver can easily understand the same. Therefore, according to the driving assistance apparatus, it is possible to prompt an appropriate action by the driver even when lane change according to the system cannot be performed.

According to the above-described embodiment, the driving assistance control part changes lanes up to the first point and does not change lanes beyond the first point, that is, the first point can be called a critical point in automatic driving.

Therefore, according to the driving assistance apparatus, it is possible to allow the driver to easily ascertain a distance or time at which lane change can be performed by displaying the distance or time to the first point. Therefore, according to the present embodiment, it is possible to reduce the psychological stress of the driver at the time of changing lanes.

According to the above-described embodiment, the driving assistance control part recommends lane change by the driver operating the steering element up to the second point and does not recommend lane change by the driver operating the steering element beyond the second point. That is, the second point can be called a critical point in manual driving. Therefore, according to the driving assistance apparatus, it is possible to allow the driver to easily ascertain a range in which the driving assistance control part can change lanes and a range in which the driver can manually change lanes by displaying the distance or time to the first point. Therefore, according to the present embodiment, it is possible to reduce the psychological stress of the driver at the time of changing lanes.

According to the above-described embodiment, the information display control part displays a display area having a predetermined size for representing information on a distance or time and displays a first object having a size corresponding to the distance or time to the first point and a second object having a size corresponding to the distance or time to the second point in the display area. That is, according to the present embodiment, the distance or time to the first point and the distance or time to the second point are displayed using indicators. Therefore, according to the driving assistance apparatus, it is possible to allow the driver to perceptually easily ascertain a range in which the driving assistance control part can change lanes and a range in which the driver can manually change lanes. Therefore, according to the present embodiment, it is possible to reduce the psychological stress of the driver at the time of changing lanes.

According to the above-described embodiment, the information display control part arranges and displays the first object in a band or linear shape and the second object in a band or linear shape continuously in the longitudinal direction. That is, in the present embodiment, the first object and the second object are displayed continuously. That is, according to the driving assistance apparatus, it is possible to display the distances or times to the first point and the second point in a manner that is perceptually easily ascertained by the driver.

According to the embodiment described above, the information display control part changes the area of the first object according to the distance or time from the host vehicle to the first point. When the distance from the target point to the host vehicle is greater than the distance from the target point to the first point, the information display control part sets the area of the second object to a certain area in accordance with the distance or time from the first point to the second point and displays the second object. The information display control part changes the area of the second object according to the distance or time from the host vehicle to the second point when the distance from the target point to the host vehicle is less than the distance from the target point to the first point. Therefore, according to the driving assistance apparatus, it is possible to display, to the driver, whether the driving assistance control part can change lanes according to the position of the host vehicle, whether lane change can be performed by an operation of the driver, or until when lane change can be performed such that the driver can easily ascertain the same.

According to the above-described embodiment, the information display control part sets the area of the second object when multiple lane changes are required to reach the target point to be greater than the area of the second object when one lane change is required to reach the target point. Therefore, when multiple lane changes are required, the distance to the first point can be set with a margin in consideration of multiple lane changes.

The embodiment described above can be represented as follows.

An apparatus including a storage medium storing instructions readable by a computer, and
    a processor connected to the storage medium,
    wherein the processor is configured, by executing the instructions readable by the computer, to:
    detect position information of a host vehicle;
    recognize a shape of a road on which the host vehicle is scheduled to travel;
    control a steering element that changes a traveling direction of the host vehicle such that the host vehicle changes lanes based on the detected position information and the recognized shape of the road;
    visually present information to a driver driving the host vehicle;
    identify a target point where lane change needs to be completed based on the shape of the road recognized by a road shape recognition part;
    further determine a first point between the target point and the host vehicle, and a second point that is a point between the target point and the host vehicle and is closer to the target point than the first point or is the same point as the target point; and
    display information on a distance or time from a position of the host vehicle to the first point and information on a distance or time from the position of the host vehicle to the second point.

Although modes for carrying out the present invention have been described using the embodiments, the present invention is not limited to such embodiments, and various modifications and substitutions can be made without departing from the scope of the present invention.

EXPLANATION OF REFERENCES

1 Vehicle system
10 Camera
12 Radar device
14 LIDAR
16 Object recognition device
20 Communication device
30 HM
40 Vehicle sensor
50 Navigation device
51 GNSS receiver
52 Navigation HMI
53 Route determination part
54 First map information
60 MPU
61 Recommended lane determination part
62 Second map information
80 Driving control unit
120 First controller
130 Recognition part
140 Action plan generation part
150 Driving assistance control part 160 Second controller
162 Acquisition part
164 Speed control part
166 Steering control part
170 Information display control part
200 Driving power output device
210 Braking device
220 Steering device
M Host vehicle
DA Display area
O1 First object
O2 Second object

What is claimed is:

1. A driving assistance apparatus comprising:
    a position detection part configured to detect position information of a host vehicle;
    a road shape recognition part configured to recognize a shape of a road on which the host vehicle is scheduled to travel;
    a steering element configured to change a traveling direction of the host vehicle;
    a driving assistance control part configured to control the steering element such that the host vehicle changes multiple lanes based on the position information detected by the position detection part and the shape of the road recognized by the road shape recognition part, resulting in multiple lane changes; and
    an information display control part configured to visually present information to a driver driving the host vehicle,
    wherein the driving assistance control part:
      identifies a target point where the multiple lane changes are to be completed, based on the shape of the road recognized by the road shape recognition part,
      determines a number of first point points based on a number of lane changes of the multiple lane changes, wherein the respective first points comprise respective points between the target point and the host vehicle, and
      determines a second point between the target point and the host vehicle, wherein the second point is:
        closer to the target point than a selected first point of the respective points between the target point and the host vehicle, or
        the same point as the target point,
    wherein the information display control part displays;
      information on at least one of a distance or a time from a position of the host vehicle to the selected first point, and
      information on at least one of a distance or a time from the position of the host vehicle to the second point, wherein the selected first point represents a first critical point where the lane change by the driving assistance control part is performed, and wherein the second point represents a second critical point where the lane change by the driver is performed.

2. The driving assistance apparatus according to claim 1, wherein the driving assistance control part changes lanes up to the selected first point and does not change lanes beyond the selected first point.

3. The driving assistance apparatus according to claim 2, wherein the driving assistance control part recommends lane change by the driver operating the steering element up to the second point and does not recommend lane change by the driver operating the steering element beyond the second point.

4. The driving assistance apparatus according to claim 3, wherein the information display control part displays a display area having a predetermined size which represents information on a distance or time, and displays a first object having a size corresponding to a distance or time to the selected first point and a second object having a size corresponding to a distance or time to the second point in the display area.

5. The driving assistance apparatus according to claim 4, wherein the information display control part continuously arranges and displays the first object in a band or linear shape and the second object in a band or linear shape in a longitudinal direction.

6. The driving assistance apparatus according to claim 5, wherein the information display control part:

changes the area of the first object according to a distance or time from the host vehicle to the selected first point, displays the second object by setting the area of the second object to a certain area in accordance with a distance or time from the selected first point to the second point, when a distance from the target point to the host vehicle is greater than a distance from the target point to the selected first point, and changes the area of the second object according to a distance or time from the host vehicle to the second point, when the distance from the target point to the host vehicle is less than the distance from the target point to the selected first point.

7. The driving assistance apparatus according to claim 6, wherein the information display control part sets the area of the second object when multiple lane changes are required to reach the target point to be greater than the area of the second object when one lane change is required to reach the target point.

8. A driving assistance method comprising:

a position detection process of detecting position information of a host vehicle;

a road shape recognition process of recognizing a shape of a road on which the host vehicle is scheduled to travel;

a driving assistance control process of controlling a steering element that changes a traveling direction of the host vehicle such that the host vehicle changes multiple lanes based on the position information detected through the position detection process and the shape of the road recognized through the road shape recognition process, resulting in multiple lane changes; and an information display control process of visually presenting information to a driver driving the host vehicle, wherein the driving assistance control process:

identifies a target point where lane change needs to be completed based on the shape of the road recognized through the road shape recognition process, determines a number of first points based on a number of lane changes of the multiple lane changes, wherein the respective first points comprise respective points between the target point and the host vehicle, and determines a second point between the target point and the host vehicle, wherein the second point is:

closer to the target point than a selected first point of the respective points between the target point and the host vehicle, or the same point as the target point, wherein the information display control process displays:

information on at least one of a distance or a time from a position of the host vehicle to the selected first point, and information on at least one of a distance or a time from the position of the host vehicle to the second point, wherein the selected first point represents a first critical point where the lane change by the driving assistance process is performed, and wherein the second point represents a second critical point where the lane change by the driver is performed.

\* \* \* \* \*